F. W. LANG.
JOINT PROTECTOR FOR SEWER PIPES.
APPLICATION FILED APR. 22, 1916.
1,255,023.
Patented Jan. 29, 1918.
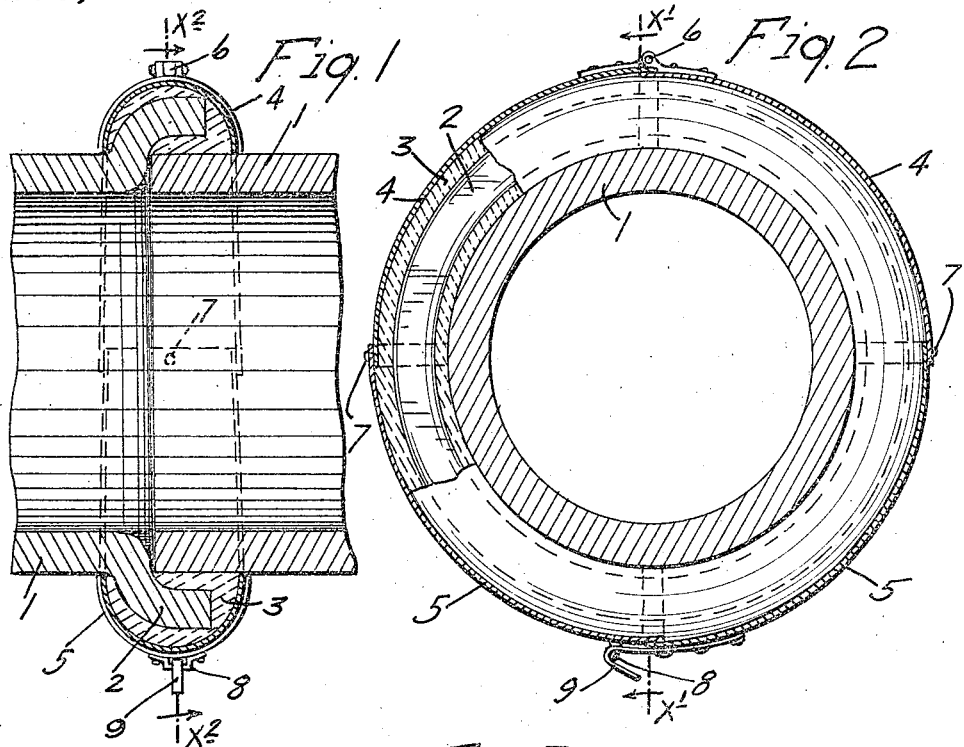
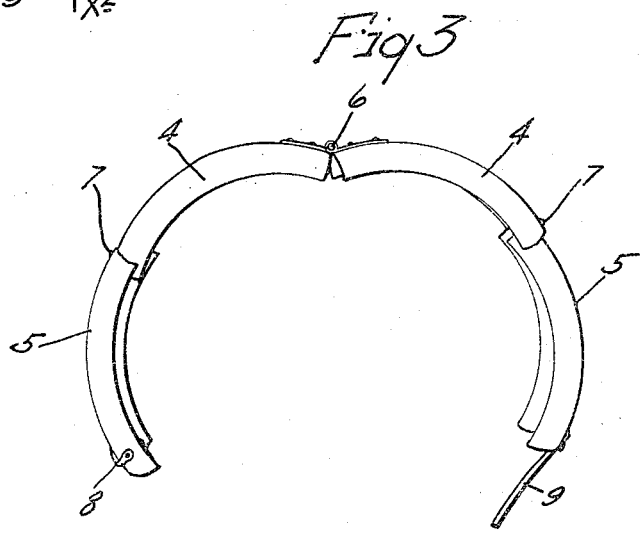
WITNESSES
E. C. Wells
A. H. Opsahl
INVENTOR
Frederick W. Lang
BY HIS ATTORNEYS
Williamson & Merchant

UNITED STATES PATENT OFFICE.

FREDERICK W. LANG, OF MINNEAPOLIS, MINNESOTA.

JOINT-PROTECTOR FOR SEWER-PIPES.

1,255,023.  Specification of Letters Patent.  Patented Jan. 29, 1918.

Application filed April 22, 1916. Serial No. 92,880.

*To all whom it may concern:*

Be it known that I, FREDERICK W. LANG, a citizen of the United States, residing at Minneapolis, in the county of Hennepin and State of Minnesota, have invented certain new and useful Improvements in Joint-Protectors for Sewer-Pipes; and I do hereby declare the following to be a full, clear, and exact description of the invention, such as will enable others skilled in the art to which it appertains to make and use the same.

My invention relates to improvements in joint protectors for sewers or similar conduits, which are made up of pipe sections connected by loose joints formed by telescoping the ends of adjacent pipe sections, one within the other; and, to this end, generally stated, the invention consists of the novel devices and combinations of devices hereinafter described and defined in the claims.

To lay sewer pipes, it is customary to dig holes in the ground, various distances apart, and then connect the same by digging small tunnels therebetween. On the bottoms of these holes and in the tunnels, the sewer pipe sections are laid. In laying the sewer pipe sections in the tunnel, it is necessary to first shove one of the pipe sections into the tunnel. A second pipe section is then telescopically connected to the first laid pipe section to form the joint therebetween. These two connected pipe sections are then shoved endwise farther into the tunnel. This operation is repeated until a sufficient number of pipe sections have been laid.

Cement is placed around the joints between the several pipe sections in an attempt to make the same waterproof. To get the cement around the joints of the pipe sections coming in the tunnels, it is necessary to place the same around the joints as the pipe sections are connected and shoved endwise into the tunnel. This cement very often drops off or is dislodged before the pipe sections reach their final resting place. The settling of the ground also very often cracks and dislodges cement around the joints, thereby rendering the same faulty. These faulty joints not only leak water but permit the roots of trees, in their search for moisture, to grow and work their way between the joints of the pipe sections, so that finally the sewer pipe becomes clogged with roots and materials collected thereby.

By the use of my invention, which is an extremely simple device and of small cost to manufacture, joints in sewer pipes and similar conduits may be made tight, thereby preventing roots from growing into or through the joints in the pipe section.

In the accompanying drawings, which illustrate the invention, like characters indicate like parts throughout the several views.

Referring to the drawings:

Figure 1 is a fragmentary longitudinal section taken on the line $x^1\ x^1$ of Fig. 2;

Fig. 2 is a section taken substantially on the line $x^2\ x^2$ of Fig. 1; and

Fig. 3 is a perspective view of the improved joint protector opened up and on a somewhat smaller scale.

The numeral 1 indicates sewer pipe sections, each having at one end a hub 2 into which the small end of an adjacent pipe section is telescoped to afford a loose joint therebetween. Cement 3 is placed around the joints between the pipe sections 1.

The improved joint protector is of annular form, segmental in cross section, and preferably constructed from sheet metal. This annular joint protector is made up of connected quarter sections adapted to be opened up, in the plane of the protector and applied around the cement joint 3 before the same has set. The sections 4 are connected by an ordinary strap hinge 6 and the inner ends of the sections 5 slightly overlap the free ends of the sections 4 and a single rivet 7 loosely connects each section 5 to the respective section 4. These rivets 7 afford wabble joints between the sections 4 and 5. The hinge 6 and wabble joint 7 permit the sections 4 and 5 to be opened up, as previously stated, in the plane of the joint protector for application around the cement 3, and they also permit the joint protector to adjust itself to iregularities in pipe joints. The wabble joint 7 also permits lateral twisting movement of the sections 4 and 5 in their application around irregular joints.

The free ends of the sections 5 are preferably overlapped and adjustably connected by a suitable fastening comprising a loop 8, rigidly secured to one of said sections, and a metal strap 9, secured by rivets at one end to the other section 5. The free end of the strap 9 is adapted to be passed through the loop 8 and bent over to connect the sections 5, as shown in Fig. 2. Obviously, the connection 8—9 permits circumferential adjustment of the joint protector around a pipe joint.

In applying the improved joint protector around a pipe joint, the cement 3 may be placed either directly on the pipe joint or in sections 4 and 5, or some of the cement may be placed directly around the pipe joint and the rest of it in the sections 4 and 5.

What I claim is:

1. The combination with pipe sections connected by a loose joint, and cement applied around said joint, of an annular joint protector comprising a plurality of sections, certain of said sections being connected by a hinge joint for circumferential flexibility and other of said sections being connected for lateral flexibility.

2. The combination with pipe sections connected by a loose joint, and cement applied around said joint, of an annular joint protector comprising a plurality of sections, certain of said sections being connected by a hinge joint for circumferential flexibility and other of said sections being connected for lateral flexibility, and a fastener for connecting the ends of said protector.

In testimony whereof I affix my signature in presence of two witnesses.

FREDERICK W. LANG.

Witnesses:
 EVA E. KÖNIG,
 HARRY D. KILGORE.

Copies of this patent may be obtained for five cents each, by addressing the "Commissioner of Patents, Washington, D. C."